US012698876B1

(12) United States Patent
Sanson et al.

(10) Patent No.: US 12,698,876 B1
(45) Date of Patent: Aug. 4, 2026

(54) WATER FEATURE WITH INTEGRATED LIGHTING SYSTEM

(71) Applicant: BELLSON ELECTRIC PTY LTD, Caringbah (AU)

(72) Inventors: David John Sanson, Taren Point (AU); Moin Rahman, Caringbah (AU)

(73) Assignee: BELLSON ELECTRIC PTY LTD, Caringbah (AU)

(*) Notice: Subject to any disclaimer, the term of this patent is extended or adjusted under 35 U.S.C. 154(b) by 0 days.

(21) Appl. No.: 19/301,666

(22) Filed: Aug. 15, 2025

Related U.S. Application Data

(60) Provisional application No. 63/684,050, filed on Aug. 16, 2024.

(51) Int. Cl.

| | |
|---|---|
| ***F21S 10/00*** | (2006.01) |
| ***B05B 1/18*** | (2006.01) |
| ***F21V 23/06*** | (2006.01) |
| ***F21V 31/00*** | (2006.01) |
| ***F21W 121/02*** | (2006.01) |

(52) U.S. Cl.
CPC ............ *F21S 10/002* (2013.01); *B05B 1/192* (2025.08); *F21V 23/06* (2013.01); *F21V 31/005* (2013.01); *F21W 2121/02* (2013.01)

(58) Field of Classification Search
CPC .......... B05B 1/18; B05B 1/192; F21S 10/002; F21W 2121/02
See application file for complete search history.

(56) References Cited

U.S. PATENT DOCUMENTS

| | | | | |
|---|---|---|---|---|
| 4,729,070 A * | 3/1988 | Chiu | F21V 17/02 362/372 |
| 8,454,200 B2 * | 6/2013 | Yang | G03B 15/04 362/249.07 |
| 9,062,839 B1 * | 6/2015 | Elder | F21S 8/03 |
| 11,892,622 B1 * | 2/2024 | Yan | F21V 33/00 |
| 2009/0154163 A1 * | 6/2009 | Wesselmeier | F21V 33/00 362/253 |
| 2009/0250528 A1 * | 10/2009 | Schnuckle | B05B 17/08 239/18 |
| 2010/0046199 A1 * | 2/2010 | Carter | F21V 33/00 362/96 |
| 2010/0276508 A1 * | 11/2010 | Davies | F21V 23/0435 239/18 |

FOREIGN PATENT DOCUMENTS

| | | | | | |
|---|---|---|---|---|---|
| CN | 201028458 Y | * | 2/2008 | F21S 8/00 |
| CN | 110220131 A | * | 9/2019 | F21V 15/00 |
| KR | 20080003283 A | * | 1/2008 | F21K 9/00 |
| KR | 20080067103 A | * | 7/2008 | F21V 31/005 |
| KR | 20100003601 U | * | 4/2010 | F21V 23/02 |
| KR | 20100061874 A | * | 6/2010 | B05B 9/0403 |
| KR | 200454738 Y1 | * | 7/2011 | |
| KR | 101081105 B1 | * | 11/2011 | B05B 17/08 |
| WO | WO-2010051765 A1 | * | 5/2010 | F21S 8/00 |

* cited by examiner

*Primary Examiner* — Alexander K Garlen
(74) *Attorney, Agent, or Firm* — HAYES SOLOWAY P.C.

(57) ABSTRACT

A lighting device for an illuminated water feature has an annular housing with an interior surface. The interior surface of the annular housing defines a fluid pathway through the annular housing. A lighting unit is positioned within the annular housing in a location not interfering with the fluid pathway. An electrical plug adapter extends from the annular housing in a location not interfering with the fluid pathway.

16 Claims, 10 Drawing Sheets

WATER FEATURE WITH INTEGRATED LIGHTING SYSTEM

CROSS REFERENCE TO RELATED APPLICATION

This application claims benefit of U.S. Provisional Application Ser. No. 63/684,050 entitled, "Water Feature with Integrated Lighting System" filed Aug. 16, 2024, the entire disclosure of which is incorporated herein by reference.

FIELD OF THE DISCLOSURE

The present disclosure is generally related to lighting features and water features and more particularly is related to water features with integrated lighting systems.

BACKGROUND OF THE DISCLOSURE

Water features are commonly used to both enhance the appearance of a pool, spa, or similar environment, as well as to make a pool experience more enjoyable for children and adults alike. Similarly, pool related lighting features may add extra ambiance and style. Some pool features have both a water feature component and a lighting feature component, creating a two in one system where the combination of the water feature with lighting provides enhanced aesthetics. However, there remains a difficulty in seamlessly combining lighting features to be within a water feature in a way to make it appear as though light is coming from within the water itself.

Some general examples of water features having lighting include fountains 2 with a light device 4 positioned near the base and angled to shine light on water spraying into the air, as shown in FIG. 1. However, in this case, there often remains a portion of the water that remains unlit from the light device 4, and furthermore, the illumination of the water feature is dependent on ideal weather conditions and pre-positioning the angle of the light device 4 relative to the fountain 2. Conventionally, lighting features and water features, although marketed as together, are two separate systems that are configured to function together.

Thus, a heretofore unaddressed need exists in the industry to address the aforementioned deficiencies and inadequacies.

SUMMARY OF THE DISCLOSURE

Embodiments of the present disclosure provide a lighting device for an illuminated water feature. Briefly described, in architecture, one embodiment of the system, among others, can be implemented as follows. An annular housing has an interior surface. The interior surface of the annular housing defines a fluid pathway through the annular housing. A lighting unit is positioned within the annular housing in a location not interfering with the fluid pathway. An electrical plug adapter extends from the annular housing, wherein the electrical plug adapter is offset from the fluid pathway.

The disclosure also provides for a method to retrofit a water feature with an illuminated water feature. The method has steps including acquiring a mounting adapter with at least one mounting flange; fastening the mounting adapter to a water bubbler, wherein the water bubbler is positioned at least partially within a pool deck.

In one aspect, the water bubbler includes a lighting unit positioned within an outer housing. The lighting unit is configured to emit a quantity of light along a light pathway.

The water bubbler also includes a bubbler lens attached to the outer housing. The bubbler lens is positioned along the light pathway. The bubbler lens is positioned at least partially within the pool deck. A fluid pathway is from the outer housing through the bubbler lens.

In another aspect, the method also includes positioning an attachment over the mounting adapter.

In yet another aspect, the attachment includes a base with an opening to accommodate the fluid pathway of the water bubbler. The attachment also has a lip formed in the base of the attachment, wherein the lip has at least one discontinuity configured to accommodate the at least one mounting flange.

In another aspect, the method also includes steps of aligning the at least one discontinuity of the lip of the base of the attachment with the at least one mounting flange; and mating the attachment to the mounting adapter with a removeable connection, wherein the mating forms a substantially watertight seal between the attachment and the mounting adapter, and wherein when the attachment and the mounting adapter are mated the fluid pathway of the water bubbler is aligned with the opening in the base of the attachment, and wherein the bubbler lens is positioned to direct at least a portion of the quantity of light from the water bubbler into the attachment.

In yet another aspect, the disclosure may also be seen as providing an illuminated water feature for use with a pool.

In another aspect, the illuminated water feature includes an annular housing having a lighting unit positioned therein. An interior surface of the annular housing defines a fluid pathway through the annular housing.

In yet another aspect, the illuminated water feature also has an electrical plug adapter electrically connectable to the lighting unit and extending from the annular housing in a position offset from the fluid pathway.

In still another aspect, the illuminated water feature further includes an attachment positioned vertically above the annular housing and receiving fluid from the fluid pathway, wherein the lighting unit emits light into the attachment to illuminate fluid within the attachment. Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
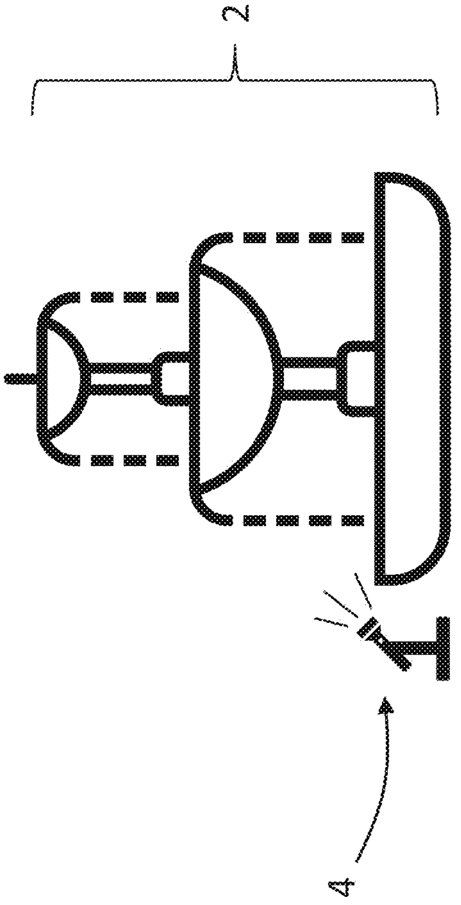
FIG. 1 (PRIOR ART)
FIG. 1 is an illustration of a lighted water fountain, in accordance with the prior art.

Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
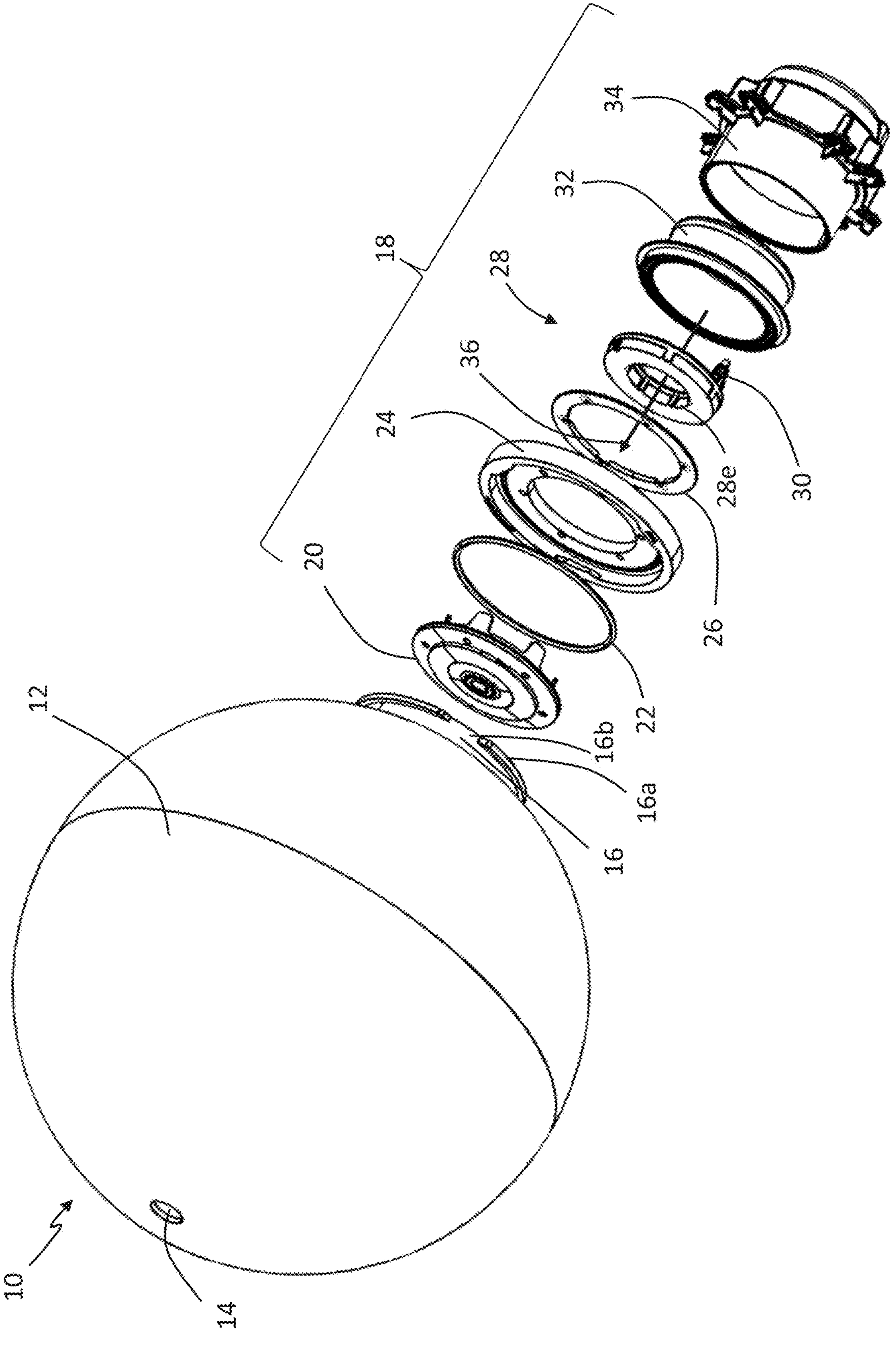
FIG. 2 is an exploded isometric view illustration of an illuminated water feature, in accordance with the present disclosure.

FIG. 2 is an exploded isometric view illustration of an illuminated water feature 10, in accordance with the present disclosure. The illuminated water feature 10 may include an annular housing 28. An interior surface 28*e* of the annular housing 28 may define a pathway through the annular housing 28. A lighting unit 28*f* (FIG. 5B) may be positioned within the annular housing 28 in a location not interfering with the fluid pathway 36. An electrical plug adapter 30 may be electrically connectable to the lighting unit 28*f* and extending from the annular housing 28. The electrical plug adapter 30 may be offset from the fluid pathway 36 in a location not interfering with the fluid pathway 36.

Figure 5B:
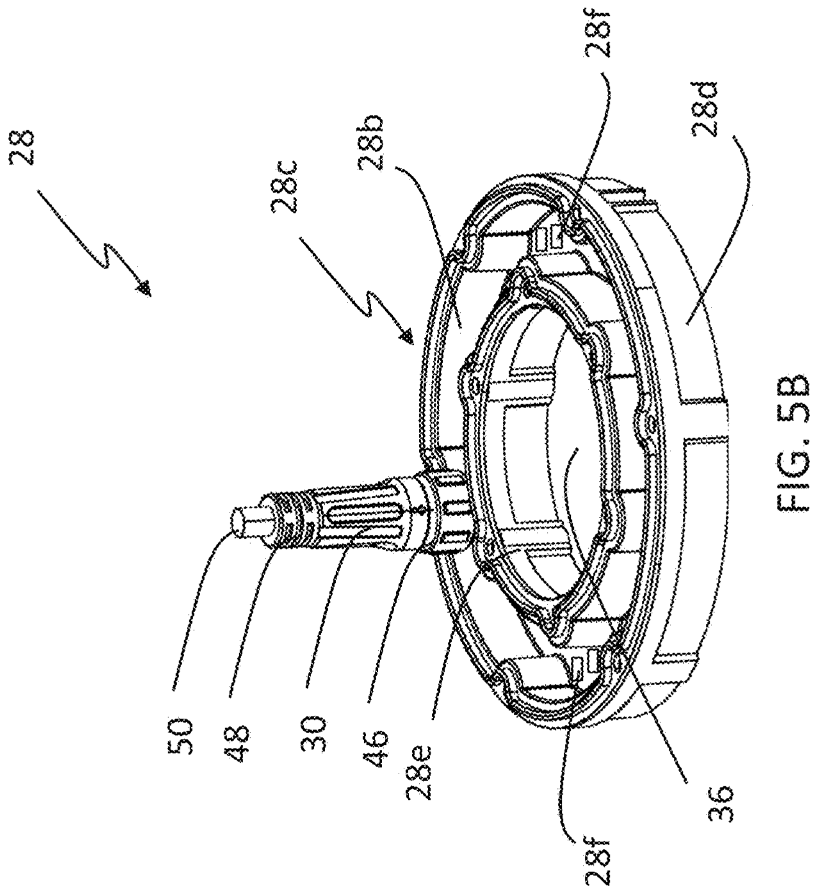
FIGS. 5A-5B are isometric view illustrations of the annular housing, in accordance with the present disclosure.
Figure 5A:
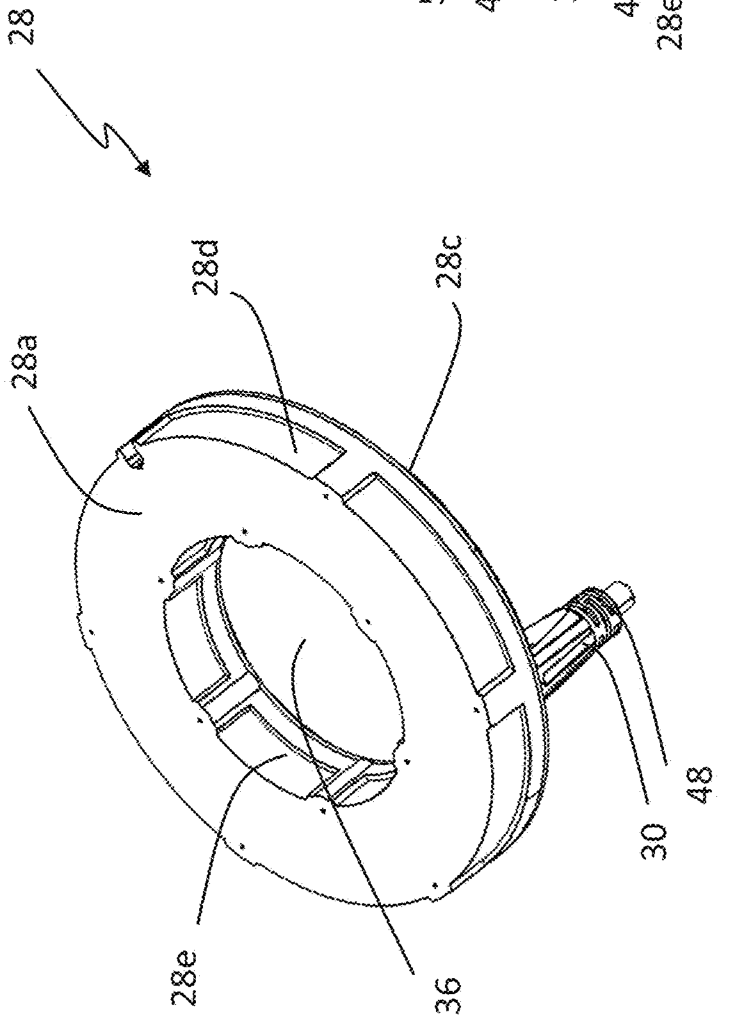

In an example in accordance with this disclosure, the electrical plug adapter 30 may have a bayonet connector 48 to electrically connect to an electrical cable 50 (FIGS. 5A-5B).

As shown, in an example in accordance with this disclosure, the illuminated water feature 10 may have an attachment 12, which may be any water feature attachment 12 with a spout 14 for water to exit, such as, for instance, a sphere which allows water to exit the spout 14 and flow down the outside of the sphere. The attachment 12 may have a base 16 which extends from the attachment 12 and allows for the attachment 12 to removably connect to a mounting assembly 18. The fluid pathway 36 may fluidically extend through the annular housing and the base of the attachment. The base 16 of the attachment 12 may have a lip 16*a*. There may be at least one discontinuity 16*b* in the lip 16*a* of the base 16 of the attachment 12 which may allow the base 16 to be removably attached to the mounting assembly 18, such as by threading the lip 16*a* of base 16 into corresponding mounting flange within mounting adapter 24. Attachment 12 may be mateably connectable to the mounting adapter 24 with a removeable connection between the at least one mounting flange and the at least one discontinuity 16*b* of the lip 16*a* of the base 16 of the attachment 12.

In an example in accordance with this disclosure, attachment 12 may be a hollow sphere connected to the base 16. At least a portion of the light pathway 38 (FIG. 4) is directable from the lighting unit 28*f* through the hollow sphere. A spout 14 may be formed in the hollow sphere, wherein the spout 14 is fluidically connected to the fluid pathway 36 through the base 16. In some example, the hollow sphere may be at least one of a transparent material or a translucent material.

The attachment 12 may be made of any material and have any shape. For instance, attachment 12 may be a sphere that is transparent, translucent, or opaque, wherein when some quantity of light passes through, the quantity of light may be visible to a viewer of the illuminated water feature 10. In some examples, the attachment 12 may be made from acrylic or glass. For instance, the attachment 12 may be an acrylic sphere that mounts to the mounting assembly 18.

The mounting assembly 18 may be mounted in a structure, such as a pool deck, and has several components and features to enable the attachment 12 to be removably connectable to it, as well as to facilitate the waterproofing of the illuminated water feature 10, such that when the illuminated water feature 10 is mounted, minimal water leaks occur. Additional components facilitate the lighting of the illuminated water feature 10 without interfering with or otherwise materially or substantially blocking water flow. In accordance with this disclosure, materially or substantially blocking the water flow may be understood to mean an obstruction of the flow of water that would cause the system to function other than as intended, that is, where a flow of water from the spout 14 is disrupted by a component of the mounting assembly 18.

As shown in FIG. 2, the mounting assembly 18 may have a bubbler lens 20, a first gasket 22, a mounting adapter 24, a second gasket 26, an annular housing 28, an electrical plug adapter 30 which may be connectable to the annular housing 28, an inner niche housing 32, and an outer niche housing 34.

In one example in accordance with this disclosure, the outer niche housing 34 may be connectable to the annular housing 28. The annular housing 28 may be positionable at least partially within the outer niche housing 34.

In another example in accordance with this disclosure, the inner niche housing 32 may be connectable to the annular housing 28. The annular housing 28 may be at least partially positionable within the inner niche housing 32.

The outer niche housing 34 may be at least partially positioned or mounted in concrete or another material from which a pool or pool decking is formed. The inner niche housing 32 may be positionable within and may engage with the outer niche housing 34 to contain components of the mounting assembly 18. For example, the inner niche housing 32 may be threaded to threadedly engage with the outer niche housing 34. The annular housing 28 may be positioned at least partially within the inner niche housing 32 or the outer niche housing 34, with the bubbler lens 20 positioned above it. The annular housing may connect to the inner niche housing 32. The mounting adapter 24 may form a mechanical connection between the attachment 12 and at least one of the inner niche housing 32 or outer niche housing 34, wherein the mechanical connection may hold the attachment 12 in place when it is connected to the mounting adapter 24. It should be noted that all components need not be arranged in the order as listed, and all components may be removably connectable to one another so as to facilitate ease in installation or for otherwise servicing various components of the illuminated water feature 10 to ensure longevity and proper functioning.

In operation, the annular housing 28 may illuminate the illuminated water feature 10 by shining light through the bubbler lens 20 and into the attachment 12.

The annular housing 28 is an annular housing that has an interior surface 28*e*, where the interior surface 28*e* of the annular housing 28 defines a fluid pathway 36 through the annular housing 28, such that water can flow through the fluid pathway 36. The annular housing 28 is discussed in further detail relative to FIGS. 5A-5B. It should be noted that though shown with a ring shape, the annular housing 28 may take any shape that accommodates a fluid pathway 36, including oval, rectangular, or polyhedral. An annular housing 28 with a round shape may be preferred when used with a rounded or spherical attachment 12.

Figure 3:
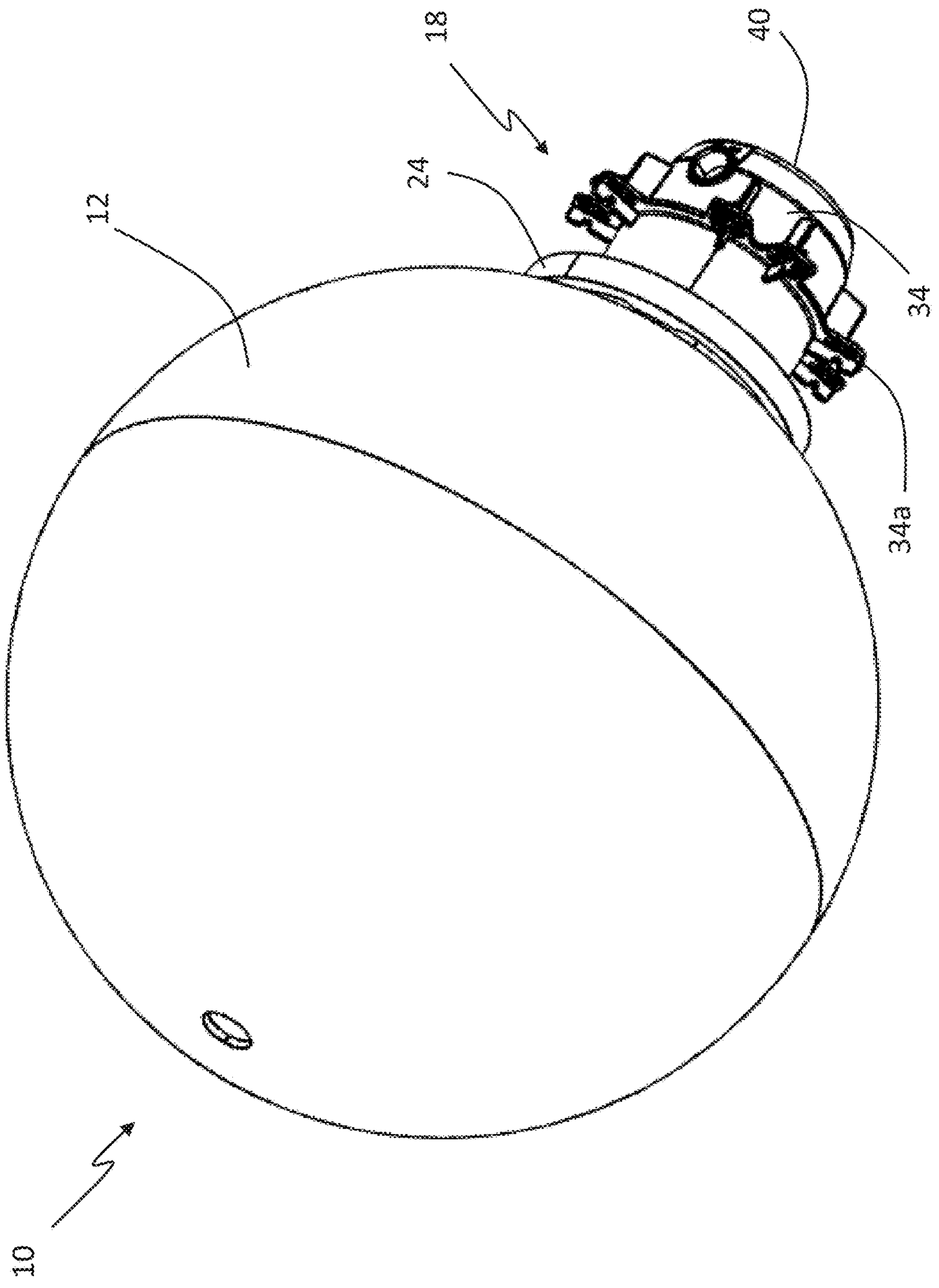
FIG. 3 is an isometric view illustration of the illuminated water feature of FIG. 2, in accordance with the present disclosure.

FIG. 3 is an isometric view illustration of the illuminated water feature 10 of FIG. 2, in accordance with the present disclosure. The illuminated water feature 10, when assembled and mounted, may only have a portion visible to a viewer. That is, depending on assembly and how the illuminated water feature 10 is mounted, a viewer may only see the attachment 12, components thereof, and a portion of the mounting adapter 24. In one example, the outer niche housing 34 may be mounted in a manner that is substantially not visible to a viewer, that is, underground, in a bore hole, within concrete, or any other medium where water features may otherwise be mounted. Substantially not visible relative to the outer niche housing 34 is understood to mean that at least the mounting brackets 34*a* may not be visible to a viewer, when looking at the illuminated water feature 10 when mounted for use. The mounting brackets 34*a* may be fixed into place using screws, or may be used as reinforcement structures to secure the outer niche housing 34 when additional concrete is poured to fix the outer niche housing 34 into the ground. The outer niche housing 34 may be materially fixed into the ground, which is understood to mean the outer niche housing 34 may be integrated with the ground, concrete, or other surface where water features may be found. The outer niche housing 34 may be configured to allow for an electrical cable 50 (FIG. 5B) to pass through and a fluid conduit 40 to connect through a bottom portion of the outer niche housing 34. The entry area for each of the electrical cable 50 and the connection area for fluid conduit 40 may be separate. That is, the fluid conduit 40 may connect through one opening of the outer niche housing 34 and the electrical cable 50 may pass 34 through a separate opening in the outer niche housing 34. The opening for the fluid conduit 40 and the electrical cable 50 may be formed in the bottom portion of the outer niche housing 34, or may be on a sidewall portion of the outer niche housing 34, or a combination of the sidewall portion and the bottom portion.

Figure 4:
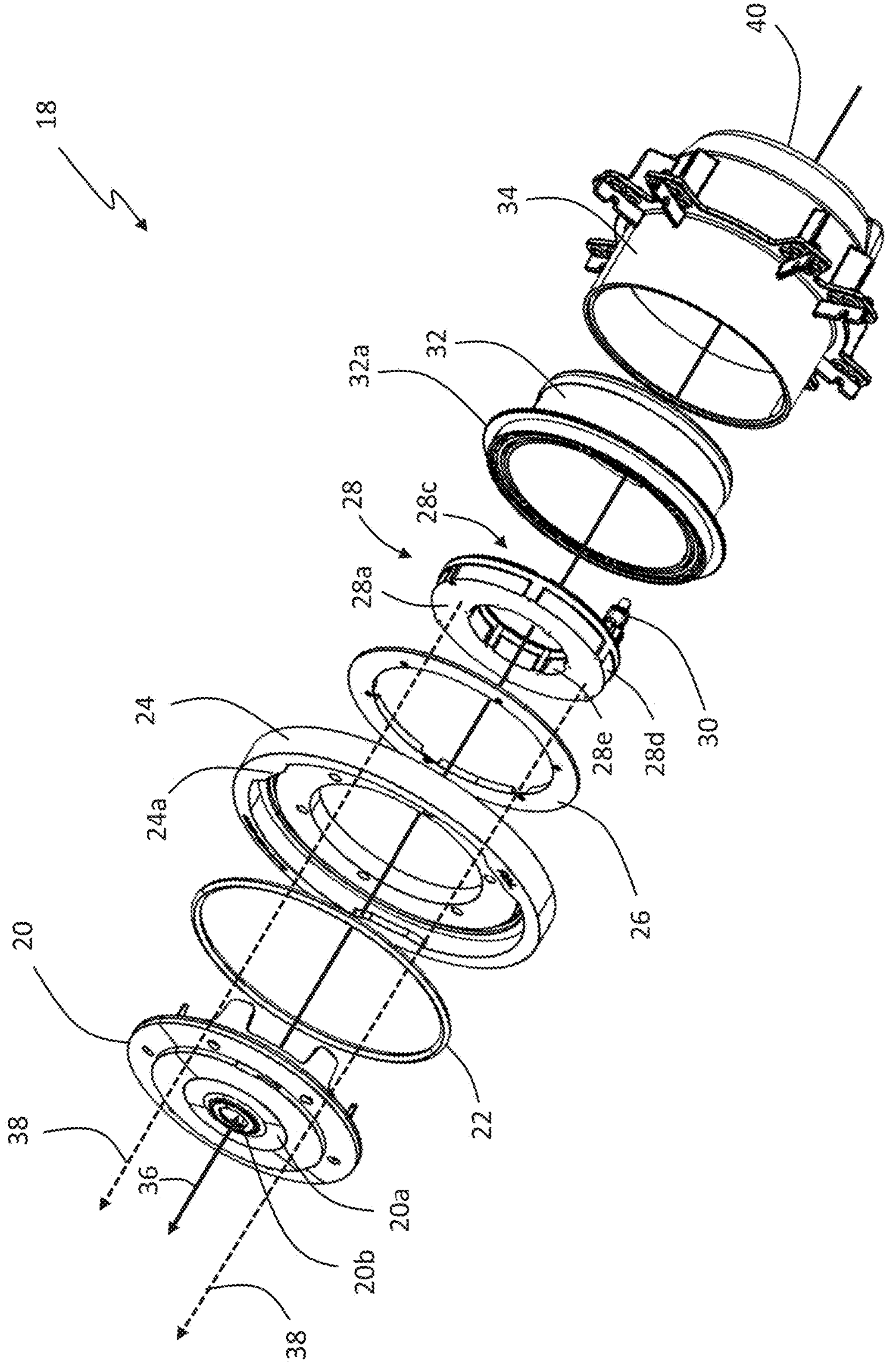
FIG. 4 is an exploded isometric view illustration of a mounting assembly, in accordance with the present disclosure.

FIG. 4 is an exploded isometric view illustration of a mounting assembly 18, in accordance with the present disclosure. With reference to FIGS. 2 and 4, the fluid pathway 36 may extend along the entire length of the mounting assembly 18 and into the attachment 12 and out of the spout 14. The fluid pathway 36, as illustrated, may begin at least from the fluid conduit 40 of the outer niche housing 34. In practical use, the fluid pathway 36 may begin upstream from the mounting assembly 18 and extend through a fluid conduit 40 that may be connected to the bottom portion of the outer niche housing 34.

In one example in accordance with this disclosure, a light pathway 38 may extend at least from the lighting unit 28*f* (FIG. 5B) of the annular housing 28 to the attachment 12. The light pathway 38 may extend along at least a portion of the length of the mounting assembly 18, when the light pathway 38 begins at the top side 28*a* of the annular housing 28. At least a quantity of the light along the light pathway 38 may be directed into the attachment 12 to illuminate the attachment 12 to provide an appearance of the water itself or the attachment 12 being intrinsically illuminated. A quantity of light may also be visible from spout 14.

The mounting assembly 18 may have several other components and features to enable a user to removably connect each component of the mounting assembly 18. Several of the components within the mounting assembly 18 may be replaceable or serviceable. Several other components may aid in waterproofing the mounting assembly 18 to minimize and avoid leaks and may direct water to attachment 12.

The bubbler lens 20 may be configured to be the outermost component of the mounting assembly 18, that is, the component that may be immediately visible when the attachment 12 is removed from the mounting assembly 18.

In an example in accordance with this disclosure, the bubbler lens 20 may have an annular window 20*a*. The annular window 20*a* may direct at least a portion of a light pathway 38 from the lighting unit 28*f* into the attachment 12. Annular window 20*a* may be substantially aligned with the footprint of the annular housing 28, so as to allow for the light pathway 38 to travel from the top side 28*a* of the annular housing 28 and through the annular window 20*a* and into the attachment 12 (FIGS. 2-3).

In another example in accordance with this disclosure, a light pathway 38 may be formed between the lighting unit 28*f* and the attachment 12, wherein the lighting unit 28*f* of the annular housing 28 is positioned to emit a quantity of light along the light pathway 38 toward a bubbler lens 20, wherein at least a portion of the quantity of light is positionable to enter the attachment 12 through the bubbler lens 20. The annular window 20*a* of the bubbler lens 20 may be any window or solid screen which allows light to pass through. In some examples, the annular window 20*a* may be a lens to magnify, reflect, or bend light in a specific manner to cause visual variations in the light in the attachment 12. The bubbler lens 20 further may have an aperture 20*b* or opening to allow for water travelling along the fluid pathway 36 to exit the mounting assembly 18 and into the attachment 12.

In an example in accordance with this disclosure, the bubbler lens 20 may be positioned between the mounting adapter 24 and the attachment 12. The mounting adapter 24 may have a mounting flange 24*a*, which is configured to mateably connect to the lip 16*a* of the base 16 of the attachment 12. Positioned therebetween is a first gasket 22. The first gasket 22 may be positioned within a trough in a top surface of the mounting adapter 24. The first gasket 22 is positioned on or within the mounting adapter 24 such that when the lip 16*e* of the base 16 of the attachment 12 mateably connects with the mounting adapter 24, a substantially watertight seal is formed with the first gasket 22, the base 16 of the attachment 12, and the mounting adapter 24, which is understood to mean that leaks may be minimized and water within the illuminated water feature 10 may be largely contained therein. A niche housing flange 32*a* may be formed in the inner niche housing 32. The niche housing flange 32*a* may be removably connectable with the outer niche housing 34. A second gasket 26 may be positionable between the niche housing flange 32*a* and the mounting adapter 24.

In another example in accordance with this disclosure, a second gasket 26 may be positioned between a sidewall 28*d* of the annular housing 28 and the niche housing flange 32*a*. The annular housing 28 may be positioned at least partially above the inner niche housing 32.

The second gasket 26 may be an annulus or ring shape that may have an inner diameter larger in diameter than at least a portion of the annular housing 28, so the second gasket 26 does not block the light pathway 38.

In some examples where the second gasket 26 is, in part, in contact with the annular housing 28, the second gasket 26 may be configured to not directly contact the annular housing 28 on its top side 28*a*. Rather, the second gasket 26 may contact the annular housing 28 around a sidewall 28*d* of the annular housing 28 so as to avoid covering any of the emitted light or light pathway 38. This may form a watertight seal around the entirety of the sidewall 28*d* of the annular housing 28. The inner niche housing 32 may be configured to contain at least part of the annular housing 28 and may also house a portion of the electrical plug adapter 30.

In another example in accordance with this disclosure, inner niche housing 32 may have a niche housing flange 32*a* positioned toward the outer niche housing 34 that allows the inner niche housing 32 to contact the second gasket 26 and create a substantially watertight seal or at least a partially watertight seal. The niche housing flange 32*a* further may allow the inner niche housing 32 to rest on and removably connect to the outer niche housing 34. A substantially watertight seal may be formed with the second gasket 26, the inner niche housing 32, and the mounting adapter 24 when the niche housing flange 32*a* is removably connected to the outer niche housing 34.

It should be noted that the components of the mounting assembly 18 may be connected or joined together with the use of any fasteners. This includes the use of threaded fasteners. In some examples, certain components of the mounting assembly 18 may be glued or fixed into place. Components glued or fixed into place may include the first gasket 22 and second gasket 26. In other examples, the first gasket 22 and second gasket 26 may be greased, or may be pressed between components tightly to create a water-tight seal. The first gasket 22 and second gasket 26 may be held in place by compressive forces placed on the components of the mounting assembly 18 by a tightened threaded fastener.

FIGS. 5A-5B are isometric view illustrations of the annular housing 28, in accordance with the present disclosure. The annular housing 28 may have an interior surface 28*e*, where the interior surface 28*e* of the annular housing defines the fluid pathway 36 through the annular housing 28. A lighting unit 28*f* may be positioned within the annular housing 28 in a location offset from the fluid pathway 36. An electrical plug adapter 30 may extend from the annular housing 28 in a position offset from the fluid pathway 36.

The annular housing 28 may have an electrical plug adapter 30 extending from, and removably connected to, the annular housing 28. The annular housing 28 may be an annular housing with a top side 28*a* and a bottom side 28*c*. The annular housing 28 may have a channel 28*b* accessible from a bottom side 28*c* of the annular housing 28. The channel 28*b* may be configured for a lighting unit 28*f* to be positioned therein. The lighting unit 28*f* may be any type of light or lamp that may fit within the channel 28*b* accessible from the bottom side 28*c* of the annular housing 28. In one example, the lighting unit 28*f* may be a light emitting diode (LED), or a plurality of LEDs. The plurality of LEDs may be arranged and positioned within the channel 28*b* as individual LEDs or may be fitted on or molded within a strip configured to be positioned within channel 28*b*. The LED may be positioned to direct at least a quantity of light emitted by the lighting unit 28*f* to be visible or extend through the top side 28*a* of the annular housing 28. To connect the lighting unit 28*f* within the annular housing 28 to a power source, the electrical plug adapter 30 may extend from the bottom side 28*c* of the annular housing 28, with a bayonet connector 48, wherein the electrical plug adapter 30 is configured to electrically connect to the lighting unit 28*f*. It should be noted that the electrical plug adapter 30 may be positioned towards the edge, or proximate to the perimeter of the annular housing 28, so the electrical plug adapter 30 is offset from the center of the annular housing 28. Further details and aspects of the electrical plug adapter 30 will be described relative to FIGS. 8-9 herein.

Figure 6:
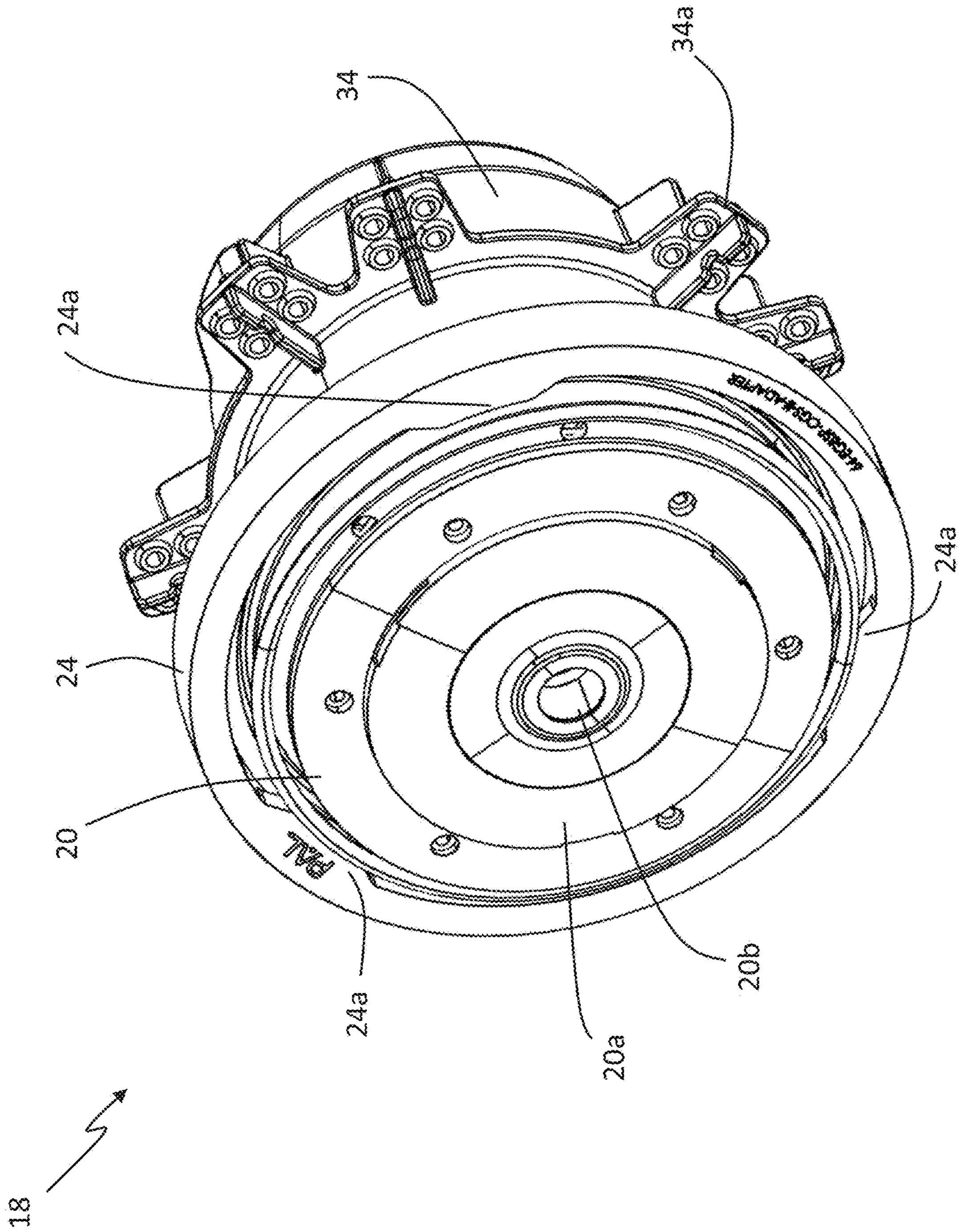
FIG. 6 is an isometric view illustration of the mounting assembly of FIG. 4, in accordance with the present disclosure.

FIG. 6 is an isometric view illustration of the mounting assembly 18 of FIG. 4, in accordance with the present disclosure. In particular, FIG. 6 provides a depiction of the bubbler lens 20 mounted to the mounting adapter 24, and the mounting flanges 24*a* of the mounting adapter 24 are visible. FIG. 6 contains many of the same features, structures, and functions as described relative to FIGS. 2-5, which are not restated for FIG. 6 for brevity in disclosure.

Figure 7:
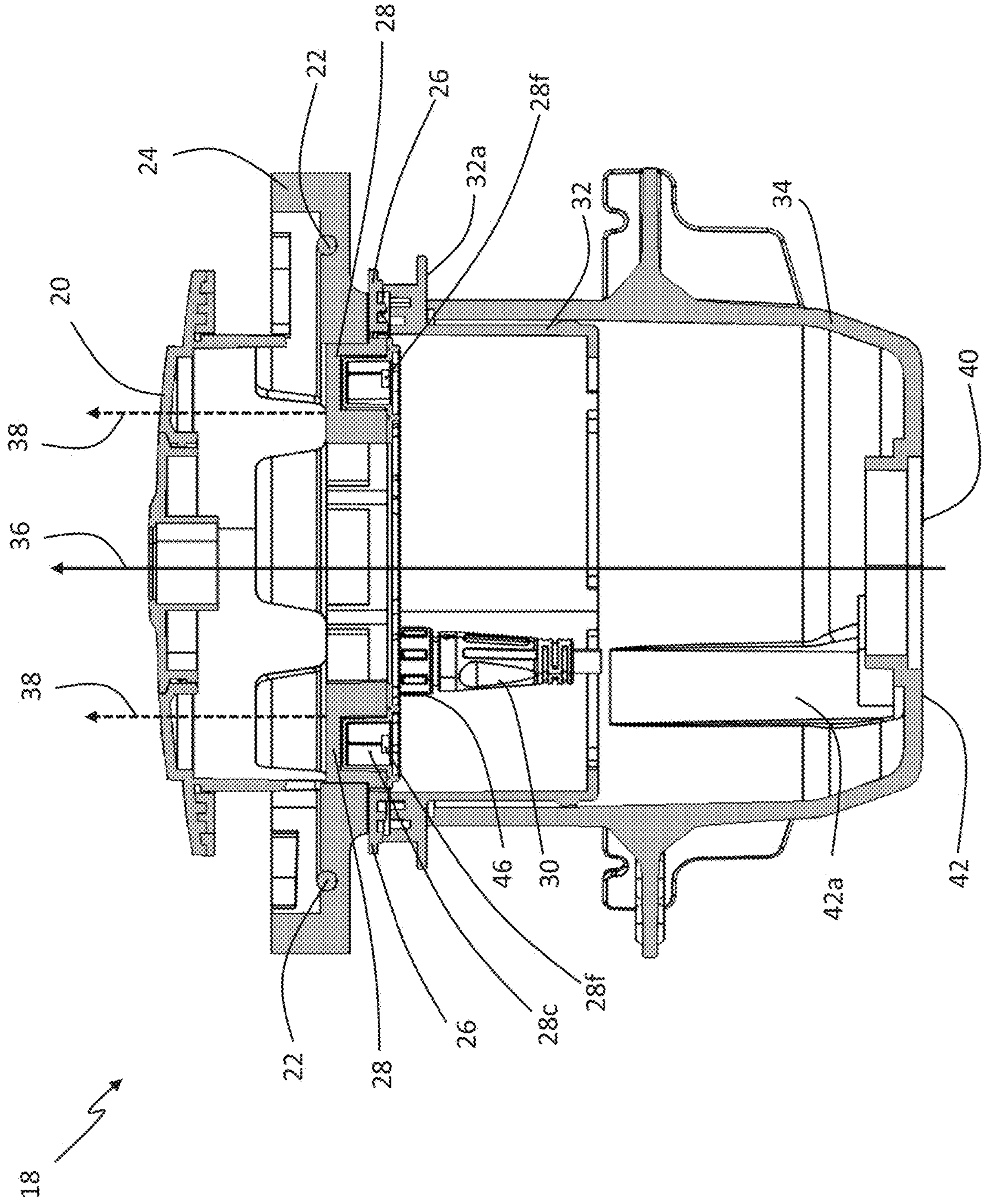
FIG. 7 is a side cross-sectional view illustration of the mounting assembly of FIG. 4, in accordance with the present disclosure.

FIG. 7 is a side cross-sectional view illustration of the mounting assembly 18 of FIG. 4, in accordance with the present disclosure. The outer niche housing 34 may have an electrical aperture 42 for the electrical cable 50 for the annular housing 28 to pass through. The electrical cable 50 may be positioned through the electrical aperture 42 and along the electrical guide 42*a* to electrically connect with the electrical plug adapter 30 which ultimately may supply electrical power to the lighting units 28*f* of the annular housing 28. FIG. 7 contains many of the same features, structures, and functions as described relative to FIGS. 2-6, which are not restated for FIG. 7 for brevity in disclosure.

Figure 8:
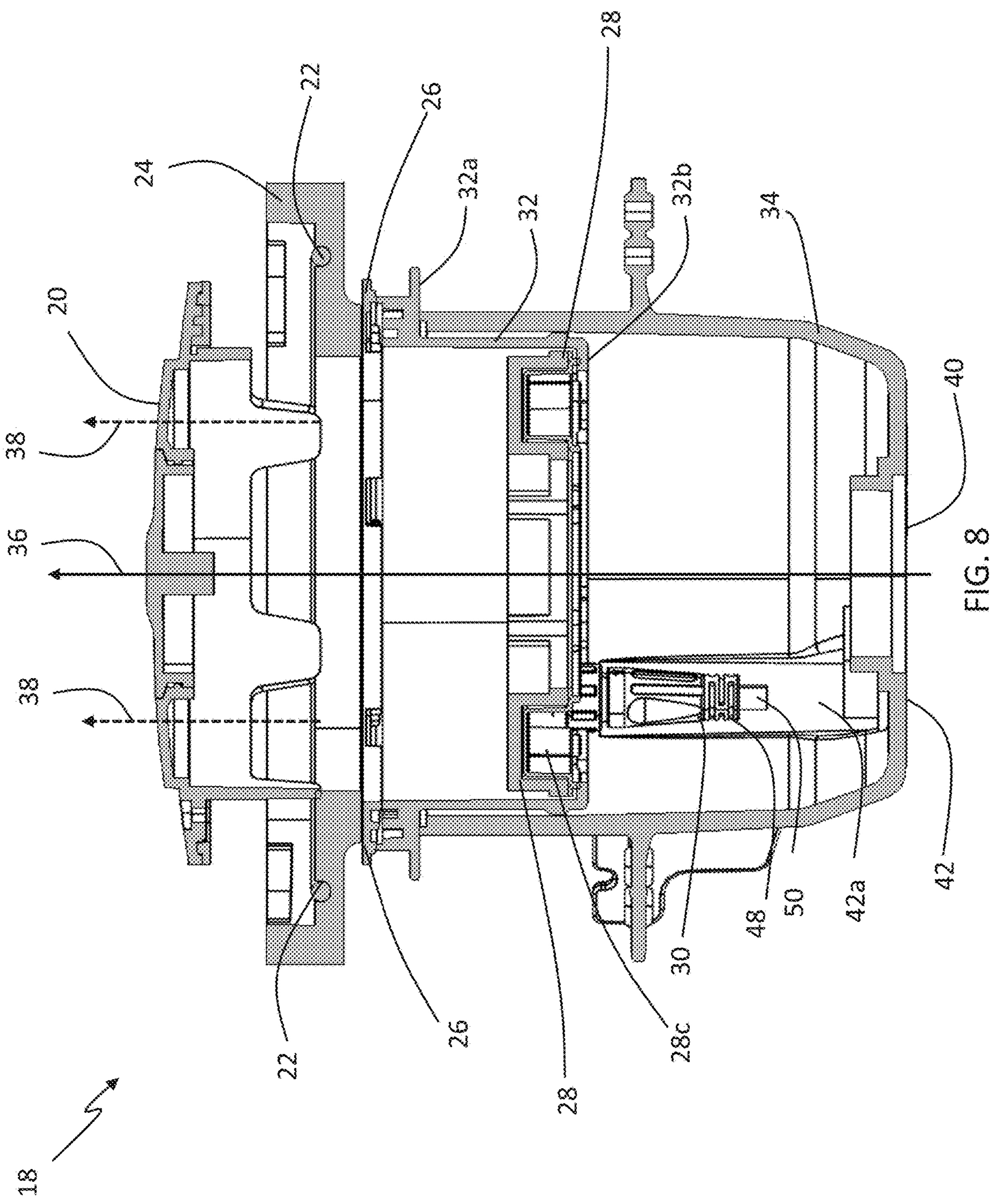
FIG. 8 is a side cross-sectional view illustration of the mounting assembly of FIG. 4, in accordance with the present disclosure.

FIG. 8 is a side cross-sectional view illustration of the mounting assembly 18 of FIG. 4, in accordance with the present disclosure. Depicted is an alternative internal configuration for the annular housing 28, where the annular housing 28 may rest on a housing base 32*b* of the inner niche housing 32. FIG. 8 contains many of the same features, structures, and functions as described relative to FIGS. 2-7, which are not restated for FIG. 8 for brevity in disclosure.

Figure 9:
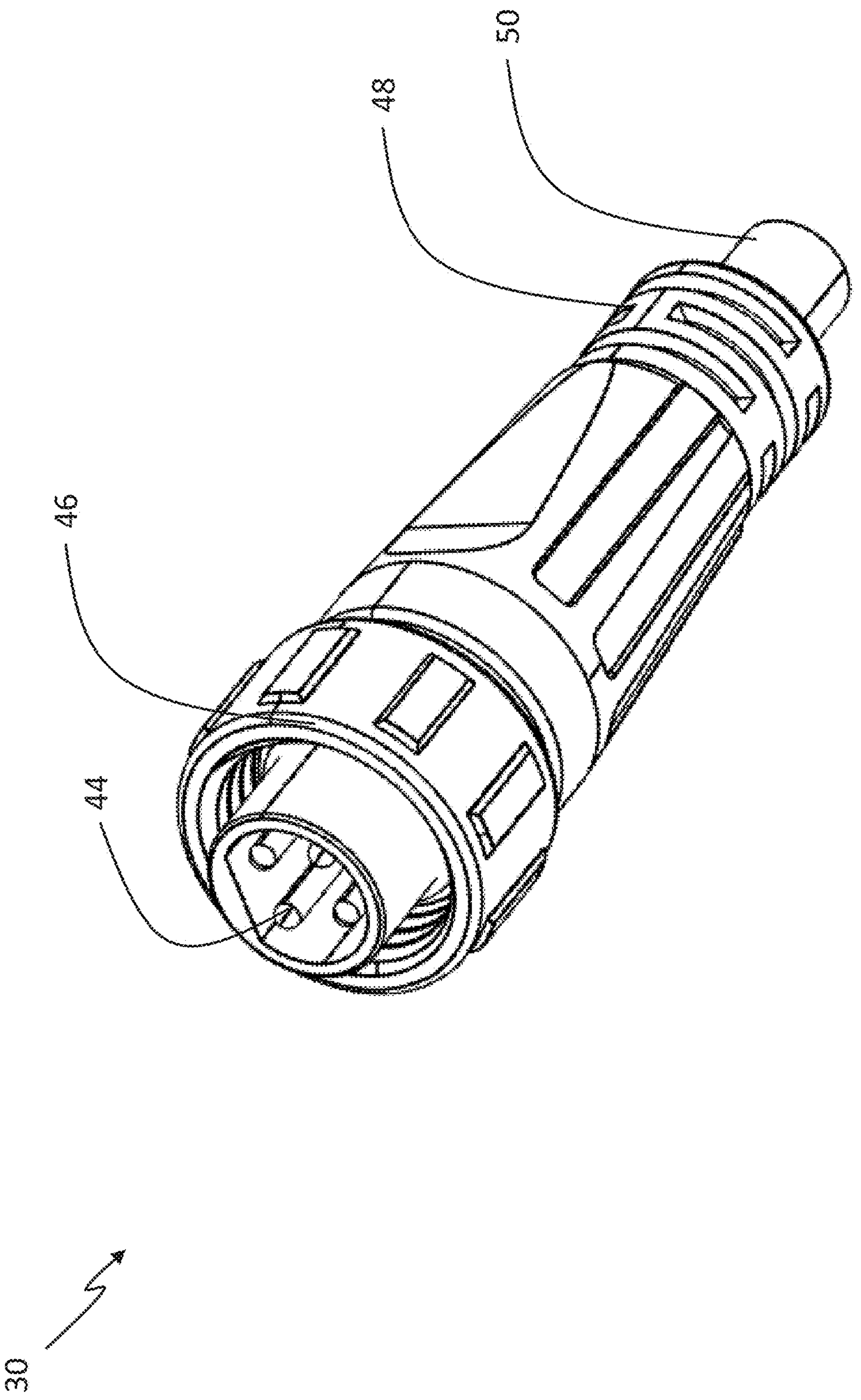
FIG. 9 is a detailed isometric illustration of an electrical plug adapter, in accordance with the present disclosure.

FIG. 9 is a detailed isometric illustration of an electrical plug adapter 30, in accordance with the present disclosure. With reference to FIG. 9, the electrical plug adapter 30 may have electrical prongs 44 positioned at least partially within the electrical plug adapter 30 and may form a removable electrical connection to the lighting unit 28*f* (FIG. 6) through the electrical prongs 44. The electrical plug adapter 30 may be removably connected to the annular housing 28 through a fastener 46. In some examples, fastener 46 may form a substantially watertight seal, such that water is not able to enter the area in the electrical plug adapter 30 having the electrical prongs 44. In some examples, fastener 46 may be threaded.

In some examples, electrical plug adapter 30 may have a bayonet connector 48 to electrically connect between electrical cable 50 and electrical plug adapter 30. For instance, at an opposing end from prongs 44, the electrical plug adapter 30 may connect with the bayonet connector 48, which may embody the general shape of the electrical plug adapter 30, and an electrical cable 50 can extend therefrom. Electrical power can be supplied to the lighting devices 28*f* through the electrical cable 50 and electrical plug adapter 30.

It is noted that the illuminated water feature 10 described herein may be used in new construction and with retrofit uses. For many existing pools, existing bubblers may experience malfunctions or fall short of providing performance desired by the consumer. The illuminated water feature 10 may be used to replace internal components of these existing bubblers, such that an existing pool can be equipped with the performance offered by the illuminated water feature 10. The illuminated water feature 10 may be used directly in retrofit situations, or it may be used with any type of bracketry, adapters, or similar devices which allow it to function with existing systems, all of which are considered within the scope of the present disclosure.

Figure 10:
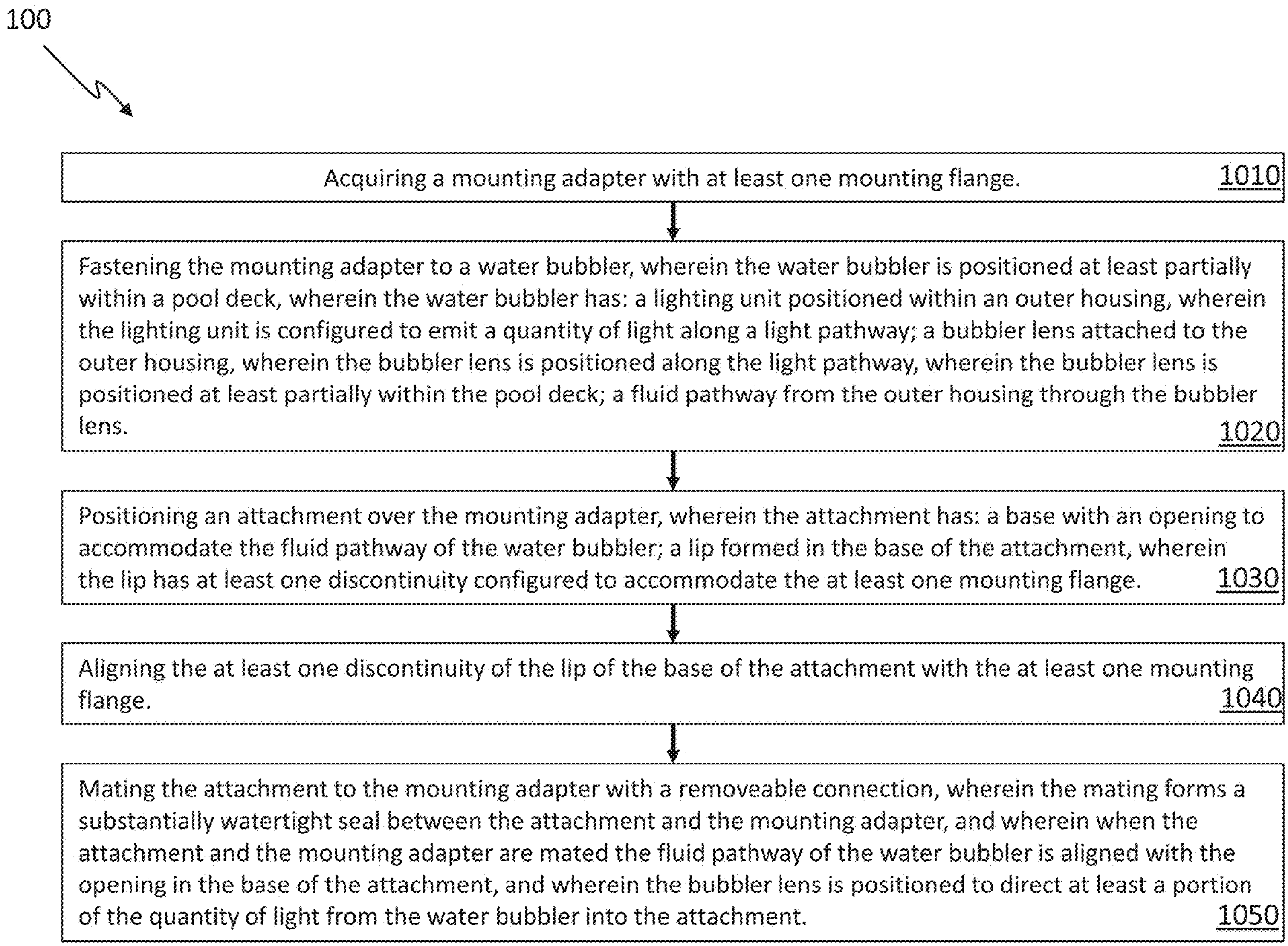
FIG. 10 is a diagrammatical flowchart illustrating a method to retrofit a water feature with an illuminated water feature, in accordance with embodiments of the present disclosure.

Yet another example in accordance with the present disclosure is illustrated by FIG. 10. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

FIG. 10 illustrates a method 100 to retrofit a water feature with an illuminated water feature. The method may include the step of acquiring a mounting adapter with at least one mounting flange, as shown in block 1010.

Further the method may also include a step of fastening the mounting adapter to a water bubbler, as shown in block 1020. The water bubbler may be positioned at least partially within a pool deck. The water bubbler may include a lighting unit positioned within an outer housing. The lighting unit may be configured to emit a quantity of light along a light pathway. The water bubbler may also include a bubbler lens attached to the outer housing. The bubbler lens may be positioned along the light pathway. The bubbler lens may be positioned at least partially within the pool deck. The water bubbler may also include a fluid pathway from the outer housing through the bubbler lens.

The method may also include the step of positioning an attachment over the mounting adapter, as shown in block 1030. The attachment may have a base with an opening to accommodate the fluid pathway of the water bubbler. The attachment may also include a lip formed in the base of the attachment, wherein the lip has at least one discontinuity configured to accommodate the at least one mounting flange.

The method may additionally include a step of aligning the at least one discontinuity of the lip of the base of the attachment with the at least one mounting flange, as shown in block 1040.

The method may also have the step of mating the attachment to the mounting adapter with a removeable connection, as shown in block 1050. The mating may form a substantially watertight seal between the attachment and the mounting adapter. When the attachment and the mounting adapter are mated the fluid pathway of the water bubbler may be aligned with the opening in the base of the attachment. The bubbler lens may be positioned to direct at least a portion of the quantity of light from the water bubbler into the attachment.

In yet another example in accordance with this disclosure, the method may also include the step of removing an internal component from the water bubbler. The outer housing of the water bubbler may be pre-installed in the pool deck.

The method may also include the step of replacing the internal component with at least one of an inner housing engageable with the outer housing of the bubbler, an electrical plug adapter removably attachable to the lighting device, a new bubbler lens configured for the mounting adapter, or an annular housing positionable within the inner housing, wherein the annular housing contains the lighting device.

In a further example of a method in accordance with this disclosure includes the step of electrically connecting an electrical plug adapter to the lighting unit. The bubbler may have an annular housing positioned within the outer housing. The annular housing may contain the lighting unit. The electrical plug adapter may extend from the annular housing. The electrical plug adapter may be offset from the fluid pathway.

The method may also include the step of forming a substantially watertight seal between the electrical plug adapter and the annular housing when the electrical plug adapter is connected to the lighting unit.

In yet another example of a method in accordance with this disclosure, the bubbler lens also may have an annular window. The annular window of the bubbler lens may direct at least a portion of the quantity of light from the lighting unit into the attachment.

In another example of a method in accordance with this disclosure, a spout may be formed in the attachment. The spout may be fluidically connected to the fluid pathway through the base of the attachment.

In a further example of a method in accordance with this disclosure, the attachment may also include at least one of a transparent material or a translucent material.

Yet another example of the present disclosure is an illuminated water feature for use with a pool. The illuminated water feature may include an annular housing having a lighting unit positioned therein. An interior surface of the annular housing may define a fluid pathway through the annular housing.

The illuminated water feature may also include an electrical plug adapter electrically connectable to the lighting unit and extending from the annular housing in a position offset from the fluid pathway.

Further, the illuminated water feature may also include an attachment positioned vertically above the annular housing and receiving fluid from the fluid pathway. The lighting unit may be positioned to emit light into the attachment to illuminate fluid within the attachment. It should be emphasized that the above-described embodiments of the present disclosure, particularly, any “preferred” embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the following claims.

What is claimed is:

1. A lighting device for an illuminated water feature, comprising: an annular housing; an interior surface of the annular housing defining a fluid pathway through the annular housing; a lighting unit positioned within the annular housing in a location not interfering with the fluid pathway; an attachment with a base; an electrical plug adapter electrically connectable to the lighting unit and extending from the annular housing, wherein the electrical plug adapter is offset from the fluid pathway; and a bubbler lens having an annular window and an aperture, the annular window directs at least a portion of a light pathway from the lighting unit into the attachment; wherein the fluid pathway fluidically extends through the annular housing, the aperture of the bubbler lens, and the base of the attachment.

2. The lighting device of claim 1, further comprising: a lip formed in the base of the attachment; at least one discontinuity in the lip of the base of the attachment; and a mounting adapter with at least one mounting flange formed to accommodate the at least one discontinuity of the lip, wherein the attachment is mateably connectable to the mounting adapter with a removeable connection between the at least one mounting flange and the at least one discontinuity of the lip of the base of the attachment.

3. The lighting device of claim 1, wherein the electrical plug adapter further comprises a bayonet connector to electrically connect an electrical cable.

4. The lighting device of claim 1, further comprising an outer niche housing connectable to the annular housing, wherein the annular housing is positionable at least partially within the outer niche housing.

5. The lighting device of claim 2, further comprising:

an inner niche housing connectable to the annular housing, wherein the annular housing is at least partially positionable within the inner niche housing;

an outer niche housing at least partially positioned within a pool deck, wherein the inner niche housing is positionable at least partially within the outer niche housing, wherein the inner niche housing is engageable with the outer niche housing, wherein the mounting adapter forms a mechanical connection between the attachment and at least one of the inner niche housing or the outer niche housing.

6. The lighting device of claim 5, further comprising: a trough in a top surface of the mounting adapter; a first gasket positionable within the trough of the mounting adapter, wherein when the lip of the base of the attachment mateably connects with the mounting adapter, a substantially watertight seal is formed with the first gasket, the base of the attachment, and the mounting adapter; the bubbler lens positioned between the mounting adapter and the attachment, wherein the bubbler lens is in contact with the first gasket; a niche housing flange formed in the inner niche housing, wherein the niche housing flange is removably connectable with the outer niche housing; and a second gasket positionable between the niche housing flange and the mounting adapter.

7. The lighting device of claim 6, wherein the second gasket is positioned between the niche housing flange and a sidewall of the annular housing, wherein the annular housing is positioned at least partially above the inner niche housing.

8. The lighting device of claim 5, wherein the inner niche housing further comprises:

a niche housing flange positioned toward the outer niche housing, wherein the niche housing flange is removably connectable to the outer niche housing; and a second gasket in contact with the niche housing flange, wherein a substantially watertight seal is formed with the second gasket, the inner niche housing, and the mounting adapter when the niche housing flange is removably connected to the outer niche housing.

9. The lighting device of claim 2, further comprising a light pathway from the lighting unit of the annular housing to the attachment.

10. The lighting device of claim 1, wherein the attachment further comprises:

a hollow sphere connected to the base, wherein at least a portion of the light pathway is directable from the lighting unit through the hollow sphere; and a spout formed in the hollow sphere, wherein the spout is fluidically connected to the fluid pathway through the base.

11. The lighting device of claim 10, wherein the hollow sphere further comprises at least one of: a transparent material or a translucent material.

12. A method to retrofit a water feature with an illuminated feature, comprising: acquiring a mounting adapter with at least one mounting flange; fastening the mounting adapter to a water bubbler, wherein the water bubbler is positioned at least partially within a pool deck, wherein the water bubbler has: a lighting unit positioned within an outer housing, wherein the lighting unit is configured to emit a quantity of light along a light pathway; a bubbler lens attached to the outer housing, wherein an annular window of the bubbler lens is positioned along the light pathway, wherein the bubbler lens is positioned at least partially within the pool deck; a fluid pathway from the outer housing through the bubbler lens; positioning an attachment over the mounting adapter, wherein the attachment has: a base with an opening to accommodate the fluid pathway of the water bubbler; a lip formed in the base of the attachment, wherein the lip has at least one discontinuity configured to accommodate the at least one mounting flange; aligning the at least one discontinuity of the lip of the base of the attachment with the at least one mounting flange; and mating the attachment to the mounting adapter with a removeable connection, wherein the mating forms a substantially watertight seal between the attachment and the mounting adapter, and wherein when the attachment and the mounting adapter are mated the fluid pathway of the water bubbler is aligned with the opening in the base of the attachment, and wherein the annular window of the bubbler lens is positioned to direct at least a portion of the quantity of light from the water bubbler into the attachment.

13. The method of claim 12, further comprising:

removing an internal component from the water bubbler; wherein the outer housing of the water bubbler is pre-installed in the pool deck; and replacing the internal component with at least one of an inner housing engageable with the outer housing of the bubbler, an electrical plug adapter removably attachable to the lighting device, a new bubbler lens configured for the mounting adapter, or an annular housing positionable within the inner housing, wherein the annular housing contains the lighting device.

14. The method of claim 12, further comprising:

electrically connecting an electrical plug adapter to the lighting unit, wherein the bubbler further comprises:

an annular housing positioned within the outer housing, wherein the annular housing contains the lighting unit, wherein the electrical plug adapter extends from the annular housing, wherein the electrical plug adapter is offset from the fluid pathway; and forming a substantially watertight seal between the electrical plug adapter and the annular housing when the electrical plug adapter is connected to the lighting unit.

15. The method of claim 12, wherein a spout formed in the attachment is fluidically connected to the fluid pathway through the base of the attachment.

16. The method of claim 12, the attachment further comprising at least one of a transparent material or a translucent material.

* * * * *